US008911034B2

(12) United States Patent
Kuo et al.

(10) Patent No.: US 8,911,034 B2
(45) Date of Patent: Dec. 16, 2014

(54) HOUSING HAVING QUICK-DISMOUNTING STRUCTURE

(71) Applicants: Lite-On Electronics (Guangzhou) Limited, Guangzhou (CN); Lite-On Technology Corporation, Taipei (TW)

(72) Inventors: Yu-Ching Kuo, Taipei (TW); Chun-Yen Lin, Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 13/952,360

(22) Filed: Jul. 26, 2013

(65) Prior Publication Data
US 2014/0097729 A1    Apr. 10, 2014

(30) Foreign Application Priority Data

Oct. 9, 2012    (CN) .......................... 2012 1 0377868

(51) Int. Cl.
A47G 29/00    (2006.01)
A47B 81/00    (2006.01)
A47B 97/00    (2006.01)
G06F 1/18    (2006.01)

(52) U.S. Cl.
CPC ...................... *G06F 1/18* (2013.01)
USPC .................... 312/223.2; 312/265.5

(58) Field of Classification Search
CPC ...................... E05C 3/10; E05C 1/10
USPC .......... 312/223.2, 265.5; 361/679.33, 679.34, 361/679.35, 679.36, 679.58
See application file for complete search history.

(56) References Cited

U.S. PATENT DOCUMENTS

| | | | |
|---|---|---|---|
| 6,373,692 B1 * | 4/2002 | Cheng | 361/679.59 |
| 7,061,755 B2 * | 6/2006 | Lin et al. | 361/679.58 |
| 7,253,359 B2 | 8/2007 | Chen et al. | |
| 7,261,383 B2 * | 8/2007 | Fan et al. | 312/223.2 |
| 8,118,377 B2 * | 2/2012 | Chen et al. | 312/223.2 |
| 8,540,327 B2 * | 9/2013 | Chen et al. | 312/223.2 |
| 2002/0163205 A1 * | 11/2002 | Sekulovic | 292/163 |
| 2010/0223761 A1 * | 9/2010 | Chen et al. | 24/1 |

FOREIGN PATENT DOCUMENTS

TW    M357165    1/2007

* cited by examiner

*Primary Examiner* — Darnell Jayne
*Assistant Examiner* — Kimberley S Wright
(74) *Attorney, Agent, or Firm* — Li & Cai Intellectual Property (USA) Office

(57) ABSTRACT

A housing having a quick-dismounting structure includes a base plate, a covering plate and a switch module. The base plate has a retaining portion. The covering plate has one side against the retaining portion and a switch recess corresponding to the side. The switch module is rotatably disposed in the switch recess and including a holding portion exposed outside the switch recess, a hooking board extended from the holding portion toward the matching board, and an elastic element. The hooking board has a fastening end faced the retaining portion. When the holding portion is moved, the hook piece shifts accordingly and the hooking end-portion is selectably hooked the retaining portion which then lock or disengage the covering plate, for dismounting the covering plate conveniently.

12 Claims, 10 Drawing Sheets

HOUSING HAVING QUICK-DISMOUNTING STRUCTURE

BACKGROUND OF THE INVENTION

1. Field of the Invention

The present invention relates to a housing, in particular to a housing having a quick-dismounting structure facilitating layout reconfiguration.

2. Description of Related Art

In order to protect the contents inside the cases, the openings are equipped with covers, such as electronics products, multi-function peripheral, daily article . . . etc. After the cover or side plate is dismounted from the housing, user can take out something or install elements.

Most the housing of electronic products, particularly all-in-one computer, computer host, sound box, battery lid, or storage cabinet, or accommodating housing. These products have historically turned the screws to fix the cover (or the side plate) to an opening of the housing. This usually results in time consuming that requires screws dismounting and often fastening, since additional screwdriver is unavoidable. Especially, if the enclosure or housing is disposed in a narrow space, it is not convenient for user to operate the screwdriver.

Taiwan Patent issued number M357165 "Computer having a quick-dismounting structure" or US patent U.S. Pat. No. 7,253,359 "computer enclosure" simplify the quick-dismounting structure of housing to reduce cost. However, the housing still has some inconvenience during operation. First, user needs to exert force to open a switch button for unlocking a side panel from the housing, and needs to exert force to take the side panel outside. But, a moving direction of the side panel maybe lateral movement or outward movement, resulting in users must to overcome the aforementioned drawback.

SUMMARY OF THE INVENTION

Therefore, an object of the present invention is to provide a housing having quick-dismounting structure, so that a covering plate can be easily and quickly locked to or disengaged from the housing.

In order to achieve the above objectives, the present disclosure is to provide a housing having quick-dismounting structure, and said housing includes a base plate, a covering plate and a switch module. The base plate has a retaining portion. The covering plate has one side corresponding to the retaining portion of the base plate and formed with a switch recess thereon. The switch module is rotatably disposed in the switch recess about a rotating axis. The switch module includes a holding portion which is exposed outside the switch recess, a hook piece which is extended from the holding portion toward the base plate, and an elastic element. The hook piece has a hooking end award faced to the retaining portion.

When holding portion is moved, the hook piece shifts accordingly and the hooking end is selectably hooked the retaining portion which then lock or disengage the covering plate.

In particularly, when the holding portion is moved outside, the hook piece shifts accordingly and the hooking end is disengaged with the retaining portion to dismount the covering plate. When the covering plate is pushed toward the base plate and the hooking end is against the retaining portion, the hook piece is rotated correspondingly and engaged with the retaining portion for closing the covering plate to the base plate.

Thus, the present disclosure has advantages as followed. When user pulled the switch module on the covering plate, meantime the covering plate moves outward. Therefore, the housing having quick-dismounting structure allows user to directly open or close the covering plate. Further, the elasticity of the elastic element of the instance disclosure not only helps the holding portion back to an original position, but also provides action and reaction force between the switch module and the retaining portion. Therefore, the present disclosure can help user to open or close the covering plate effortlessly, so that the operation thereof is simple and easy.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE PREFERRED EMBODIMENTS

Figure 1:
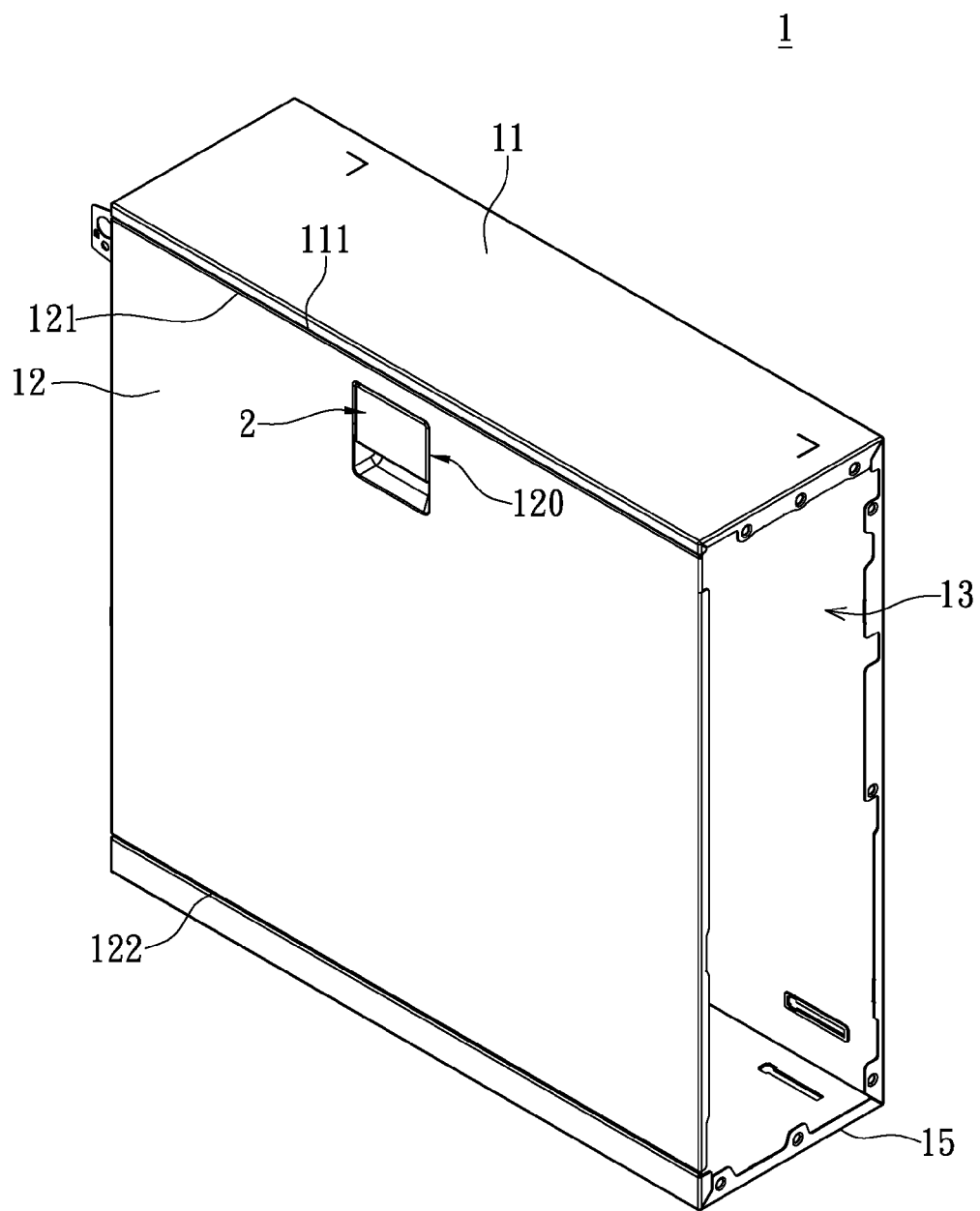
FIG. 1 is an assembled perspective view of a housing having quick-dismounting structure according to the present disclosure.

Please refer to FIG. 1, which is an assembled perspective view of a housing having quick-dismounting structure according to the present disclosure. In this embodiment, the housing 1 is illustrated as a computer housing, but it is not limited thereto. The present disclosure can be applied in any housing having a covering plate. The housing 1 includes a base plate 11, a side plate 13, a bottom plate 15, and a covering plate 12. The covering plate 12 has a switch module 2 to lock with the base plate 11.

Figure 2:
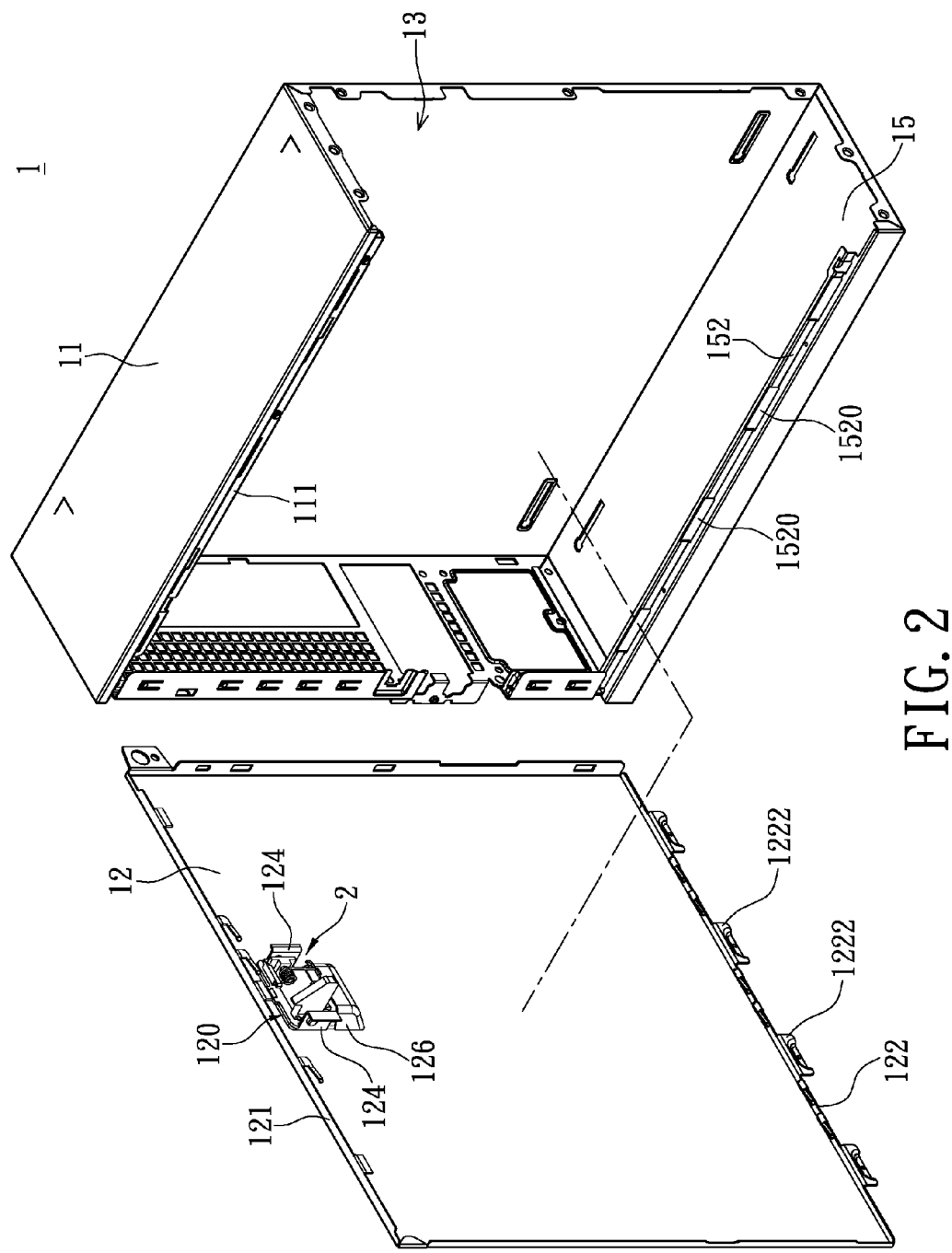
FIG. 2 is an exploded perspective view of housing having quick-dismounting structure according to the present disclosure.

Please refer to FIG. 2, which is an exploded view of the housing having quick-dismounting structure according to the present disclosure. The base plate 11 has a retaining portion 111 formed on an inner side thereof. The covering plate 12 has a first end edge 121 against the retaining portion 111. The first end edge 121 in this embodiment is a top edge. The covering plate 12 is formed with a switch recess 120 adjacent to the first end edge 121. The switch recess 120 is partially through the covering plate 12. The covering plate 12 has a second end edge 122 formed with a plurality of plug portions 1222. The bottom plate 15 has an inserting portion 152. The inserting portion 152 is formed with a plurality of inserting holes 1520 corresponding to the plug portions 1222. To assemble the covering plate 12 to the housing 1, firstly, the plug portions 1222 of the covering plate 12 are inserted in the inserting holes 1520 of the bottom plate 15 respectively, and then the switch module 2 is engaged with the base plate 11.

Figure 2A:
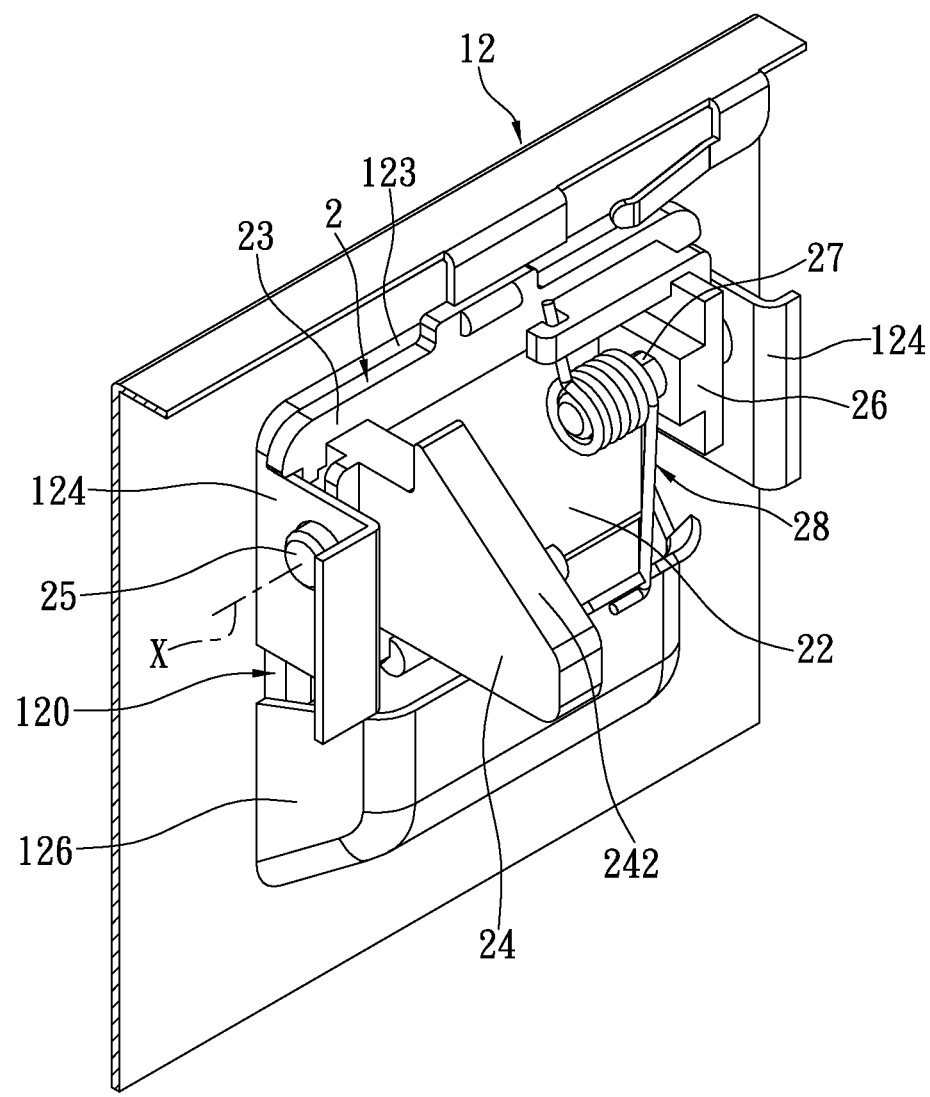
FIG. 2A is a partial enlarged view of FIG. 2 of covering plate and switch module.
Figure 2B:
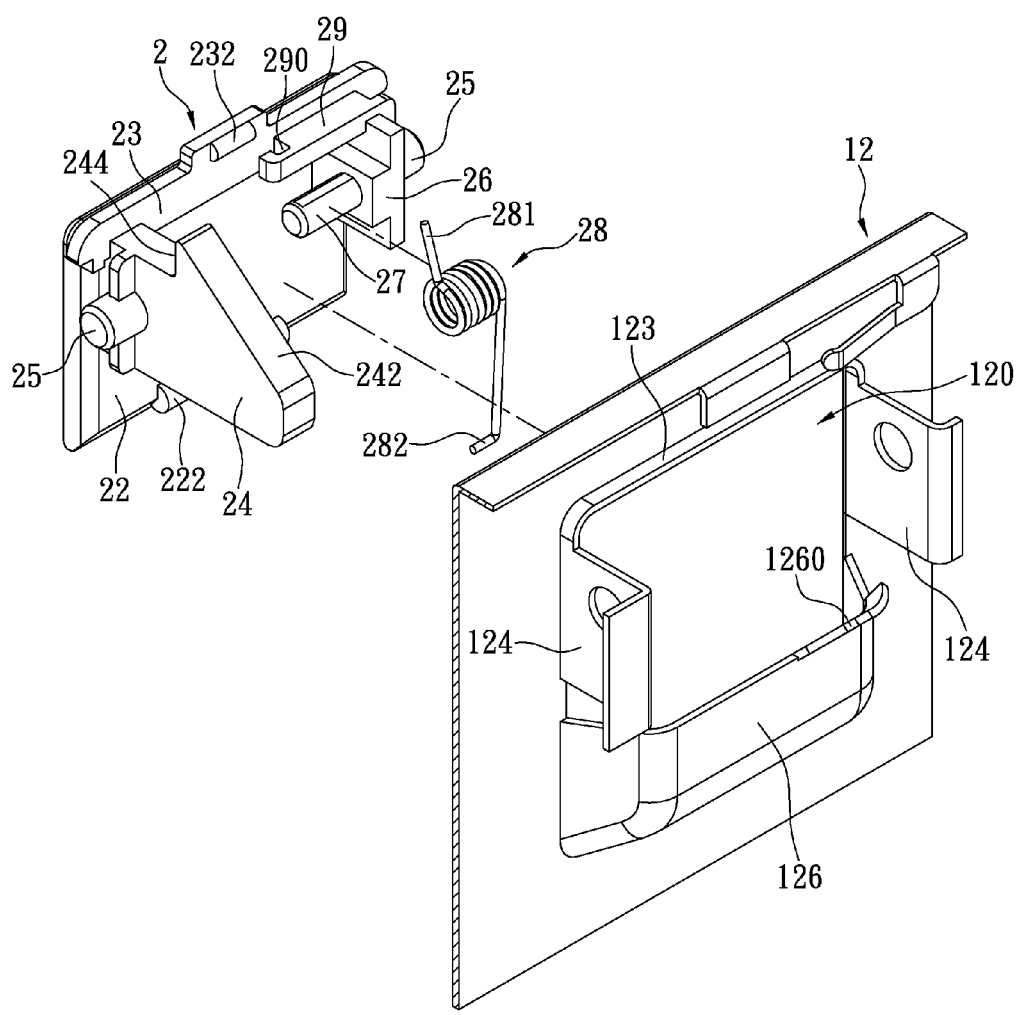
FIG. 2B is an exploded view of FIG. 2A.

Please refer to FIG. 2A and FIG. 2B. FIG. 2A is a partial enlarged view of the covering plate and the switch module in FIG. 2, and FIG. 2B is an exploded view of FIG. 2A. The switch module 2 is rotatably mounted in the switch recess 120 along a rotating axis X between a locking position and an opening position. As shown in FIG. 1, when the switch module 2 is arranged in the locking position, the switch module 2 is aligned with an outer surface of the covering plate 12, and meantime the covering plate 12 is locked with the base plate 11. When the switch module 2 is arranged in the opening position, a bottom end of the switch module 2 is pulled outward and rotated, and the covering plate 12 can be moved away from the base plate 11.

The switch module 2 includes a holding portion 22 partially covered the switch recess 120, a hook piece 24 extended from the holding portion 22 toward the base plate 11, and an elastic element 28 pushed the switch module 2 back to an original position. The original position means the position before being pulled outward, which means the locking position in this embodiment, but it is not limited thereto. The hook piece 24 has an oblique surface 242 faced toward the retaining portion 111, and a hooking end 244 toward the retaining portion 111. The oblique surface 242 is approximated to the hooking end 244. When the holding portion 22 is pulled out, it will rotate with the hook piece 24. In the meantime, the hooking end 244 can hook with the retaining portion 111, which is in the locking position, or alternatively depart from the retaining portion 111, which is in the opening position. Thus, the hook piece 24 can be switched between the two foresaid positions, and the covering plate 12 can be conveniently mounted or dismounted.

Please refer to FIG. 2B. The covering plate 12 has a pair of pivoting boards 124 extended toward an interior of the housing. The pair of pivoting boards 124 is disposed at two sides of the switch recess 120. Each side of the switch module 2 has an axle portion 25, which are pivotably mounted on the pair of pivoting boards 124. In detail, the switch module 2 has a mounting seat 26 opposite to the hook piece 24. The pair of axle portions 25 is formed on an outer side of the hook piece 24 and the mounting seat 26, respectively.

Following is the detail arrangement of the elastic element of this embodiment. The elastic element 28 of this embodiment can be a torsion spring. The mounting seat 26 has an inner shaft 27 extended toward the hook piece 24, and the torsion spring is put around the inner shaft 27. The torsion spring has a first end 281 against the holding portion 22, and a second end 282 against an inner side of the covering plate 12. In detail, the holding portion 22 has a fixing piece 29 formed on an inner side thereof above the mounting seat 26. The fixing piece 29 is formed with a retaining hole 290, and the first end 281 of the torsion spring is fixed in the retaining hole 290 of the fixing piece 29. Besides, the covering plate 12 has a shield part 126 partially surrounded a lower part of the switch recess 120 and toward the pair of pivoting boards 124. The shield part 126 has a mounting tab 1260 formed on a top edge thereof and approximated to the inner shaft 27. The second end 282 of the torsion spring is fixed in the mounting tab 1260.

Please refer to FIG. 2B. The holding portion 22 has a stopping member 23 formed a top edge thereof, and faced to the first end edge 111 of the base plate 11. The stopping member 23 is disposed in the switch recess 20 and against an inner edge of the covering plate 12. As shown in FIG. 2B, the holding portion 22 further includes an anti-sliding portion 222 formed on the bottom edge of the holding portion 22 and opposite to the stopping member 23. In this embodiment, the stopping member 23 is extended to two sides and against an edge of the pair of pivoting boards 124. The covering plate 12 of this embodiment is inwardly protruded with a flange 123 along a top edge of the switch recess 120 corresponding to the stopping member 23. The stopping member 23 is arranged against the flange 123, so that the top edge of the switch module 2 is blocked by the edge of the switch recess 120.

The stopping member 23 of this embodiment has a pushing block 232 protruded inward and approximated to the retaining portion 111. The pushing block 232 and the hooking end 244 are located at two sides of the retaining portion 111 respectively. When the hooking end 244 is moved away from the retaining portion 111, the pushing block 232 is against the retaining portion 111. According to this embodiment, when the hooking end 244 left the retaining portion 111 of the base plate 11, that means it is in unlocking condition, a force exerted by user on the switch module 2 will directly act on the hook piece 24 through the pushing block 232 of the stopping member 23, and the covering plate 12 will leave immediately the retaining portion 111 of the base plate 11. In other words, this embodiment has advantages of direct-operation and effort-saving, when opening the covering plate 12.

Figure 3A:
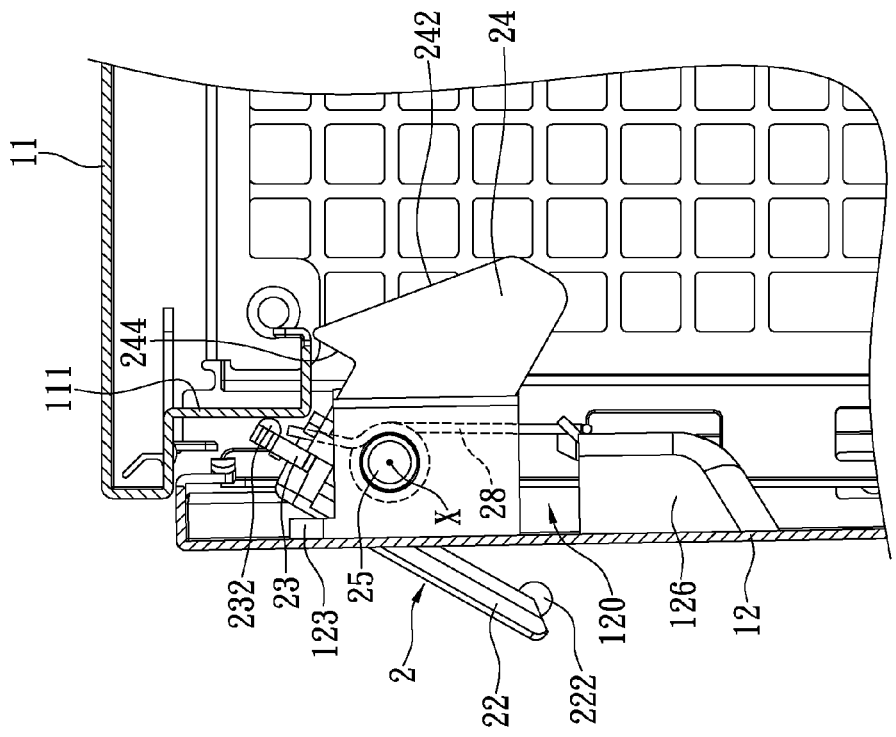
FIGS. 3A to 3F are side views of the housing during the covering plate is opening according to the present disclosure.

Please refer to FIGS. 3A to 3F, which show cross-sectional views of different actions during opening the covering plate 12. The retaining portion 111 is substantially L-shaped in a cross-sectional view, including a vertical portion extended downward from a side edge of the base plate 11, and a horizontal portion inwardly extended toward the housing. A distance between the pushing block 232 and the hooking end 244 is larger than the length of the horizontal portion of the retaining portion 111, as shown in FIG. 3A.

Please refer to FIG. 3A, which shows the switch module 2 in a locking position. The rotating axis X, which is located on a center of axle portion 25, is substantially arranged under the retaining portion 111. In this position, the top end of the holding portion 22, which is formed with the stopping member 23, is extended to an outer side of the retaining portion 111. The pushing block 232 faces the retaining portion 111. Besides, the hooking end 244 of the hook piece 24 is hooked to an inner side of the retaining portion 111.

Figure 3B:
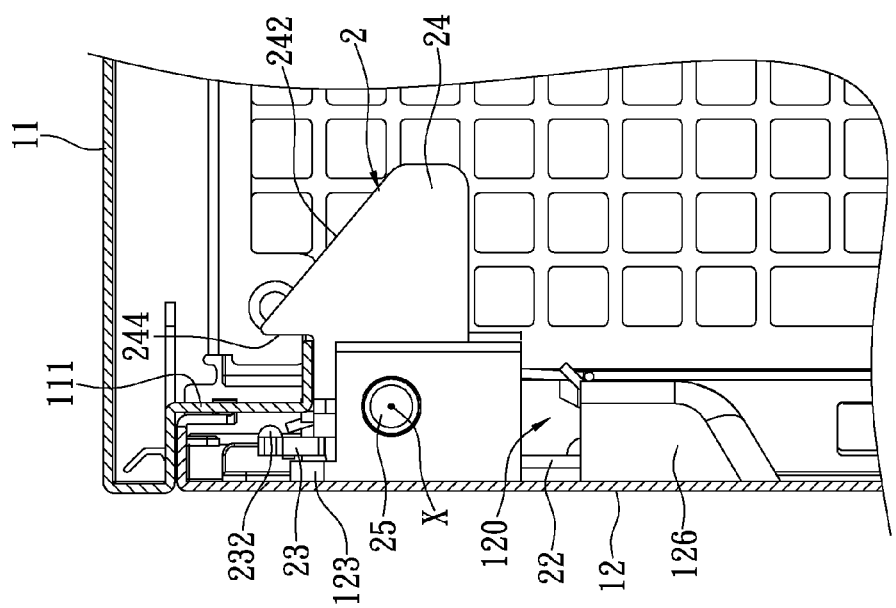

Please refer to FIG. 3B, which shows the holding portion 22 which is pulled outward by user to open the switch module 2. The hook piece 24 is rotated in clockwise direction along the rotating axis X, so that the hooking end 244 can leave the retaining portion 111. In the meantime, the pushing block 232 on the top end of the holding portion 22 exerts an action force on the retaining portion 111 of the base plate 11. According to law of action and reaction, the retaining portion 111 of the base plate 11 therefore exerts a reaction force on the holding portion 22, which is on the covering plate 12. Thus, the covering plate 12 simultaneously moves outward away from the base plate 11. In other words, the opening action by user pulling the holding portion 22 also makes the covering plate 12 to move outward. Comparing some traditional computer housing, user not only needs to turn a switch, but also needs to exert force to pull the covering plate outward away from the housing. The opening action of prior art is not direct and not simple.

Figure 3C:
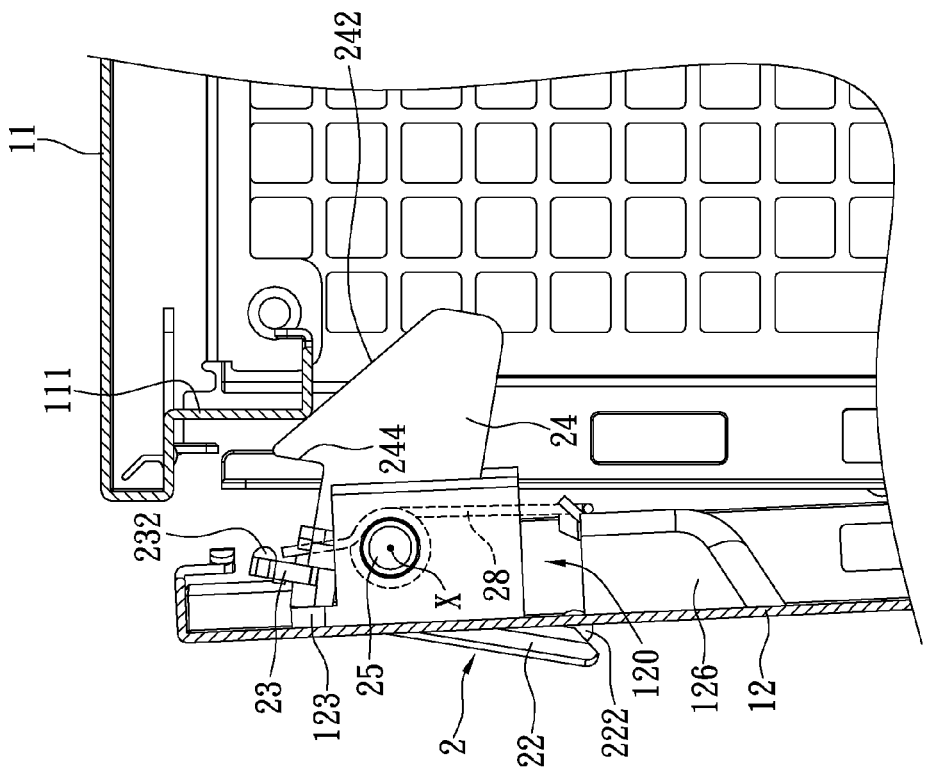

Please refer to FIG. 3C, which shows the covering plate 12 left outward the base plate 11 with a predetermined distance. In this condition, the elastic element 28 is twisted and stores elasticity because of the rotation of the holding portion 22. The hooking end 244 of the hook piece 24 slides over a bottom side of the retaining portion 111.

Figure 3D:
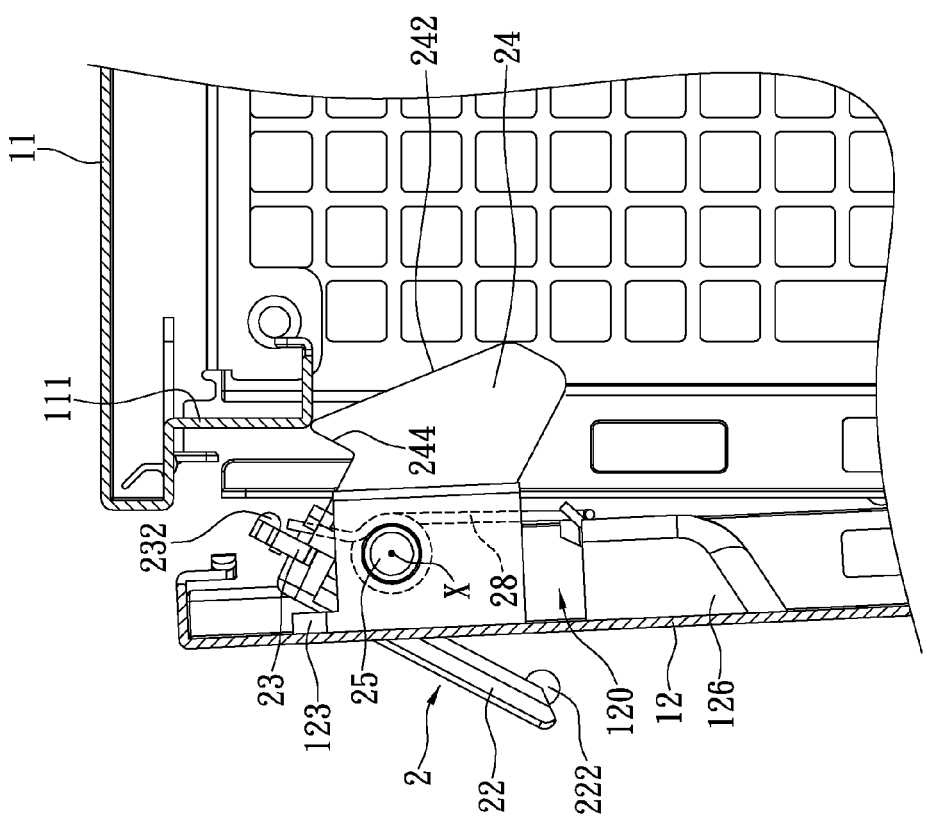

Please refer to FIG. 3D, which shows the holding portion 22 of the switch module 2 rotating into the switch recess 120 in counterclockwise direction along the rotating axis X. The holding portion 22 shown in this condition can be deemed as being released by user. In this condition, the plug portions 1222 of the covering plate 12 is still wedged in the inserting holes 1520 of the bottom plate 15, so that the covering plate 12 can be pushed outward about its bottom end as the fulcrum.

Through the recovering elasticity from the elastic element 28, the oblique surface 242 of the hook piece 24 contacts and exerts an action force on a bottom of the retaining portion 111. The retaining portion 111 provides a reaction force on the hook piece 24, which is also on the covering plate 12. Even user did not exert force, and the covering plate 12 can be continuously pushed outward so as to disengage the covering plate 12 from the base plate 11 effortlessly, as shown in FIG. 3E, until the holding portion 22 of the switch module 2 completely coming into the switch recess 120. The present disclosure therefore provides an effortless operation for user.

Figure 3F:
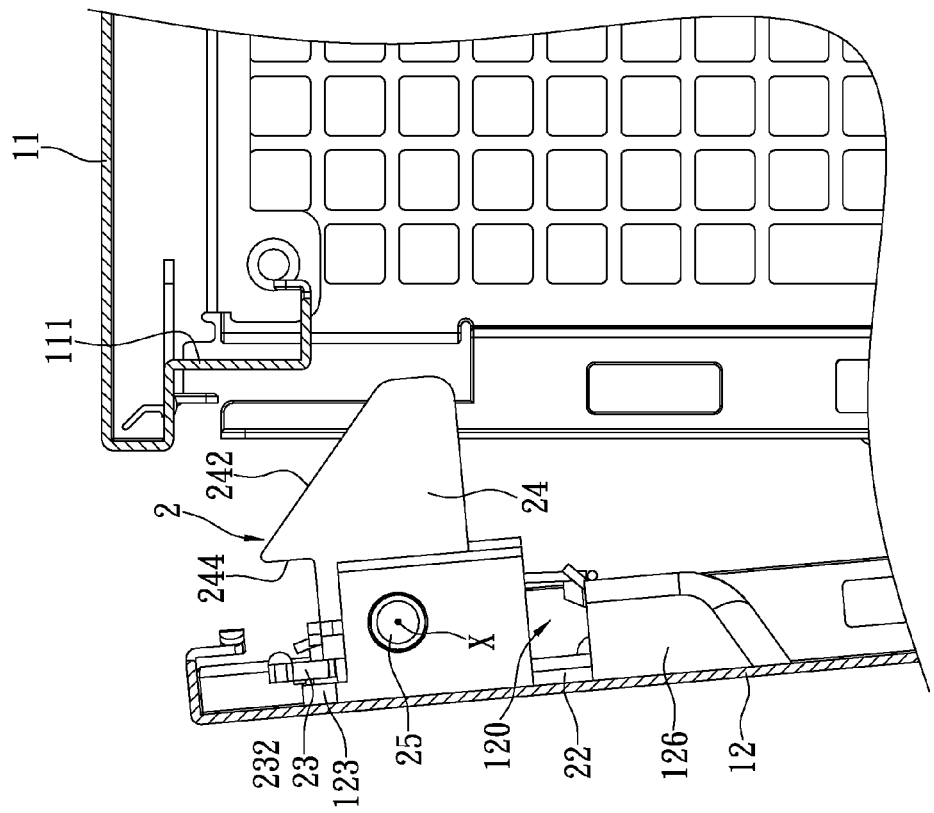
Figure 3E:
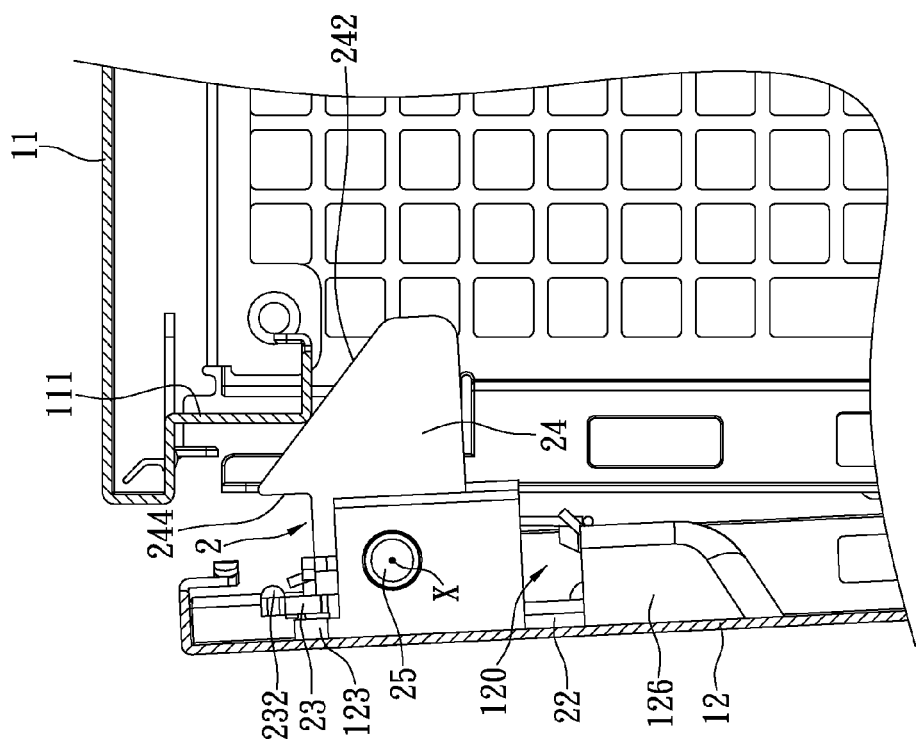

Please refer to FIG. 3F, showing the switch module 2 completely away from the base plate 11. In this condition, the covering plate 12 is slanted and a little distance from the base plate 11a, so that user can conveniently take the covering plate 12 outward. In the meantime, even the user did not exert force on the covering plate 12, the covering plate 12 is still able to be pushed outward by gravity and more far away the base plate 11. The user can take the covering plate 12 outward more conveniently.

Refer to FIGS. 4A to 4F, which are different conditions about the covering plate 12 being pushed until closed the covering plate 12 on the base plate 11.

Figure 4B:
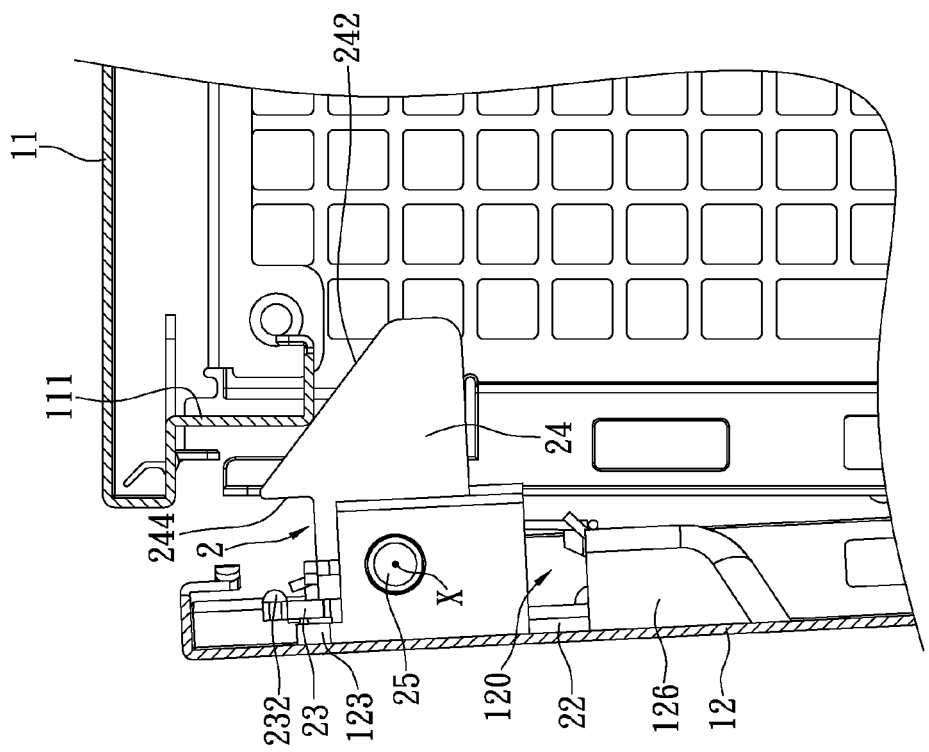
FIGS. 4A to 4F are side views of the housing during closing the covering plate according to the present disclosure.
Figure 4A:
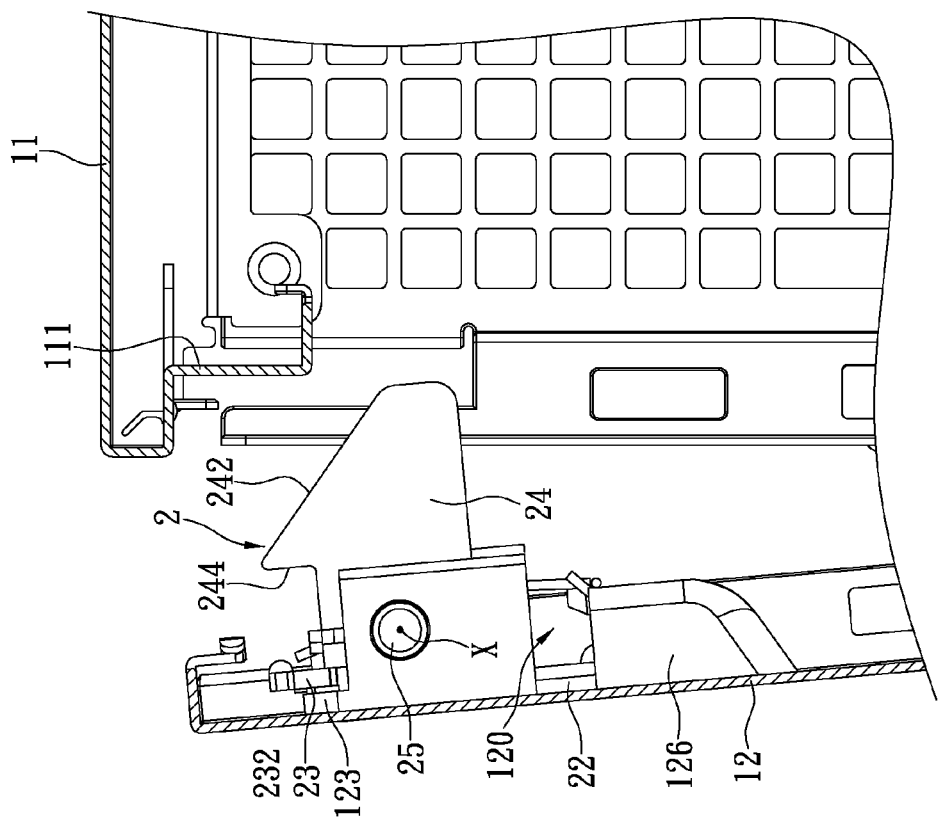

Please refer to FIG. 4A. When user wants to close the covering plate 12 to the base plate 11, the second end edge 122 of the covering plate 12 is firstly inserted into an outer edge of the bottom plate 15 (see FIG. 2), so the covering plate 12 can be rotated about the second end edge 122. Then, the user only needs to push the covering plate 12 toward the base plate 11.

Figure 4C:
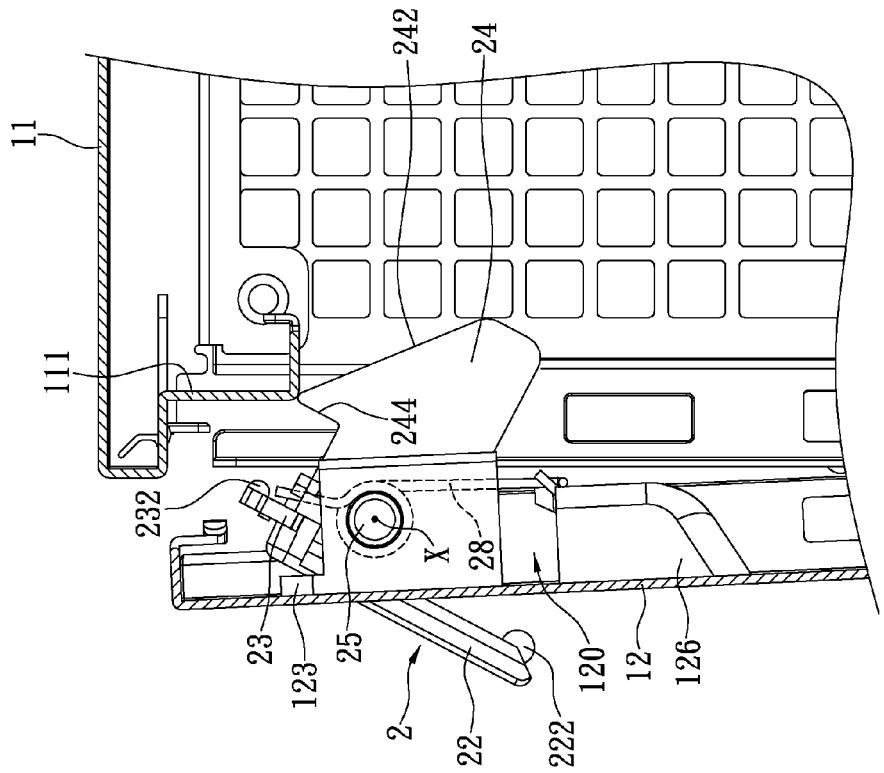
Figure 4D:
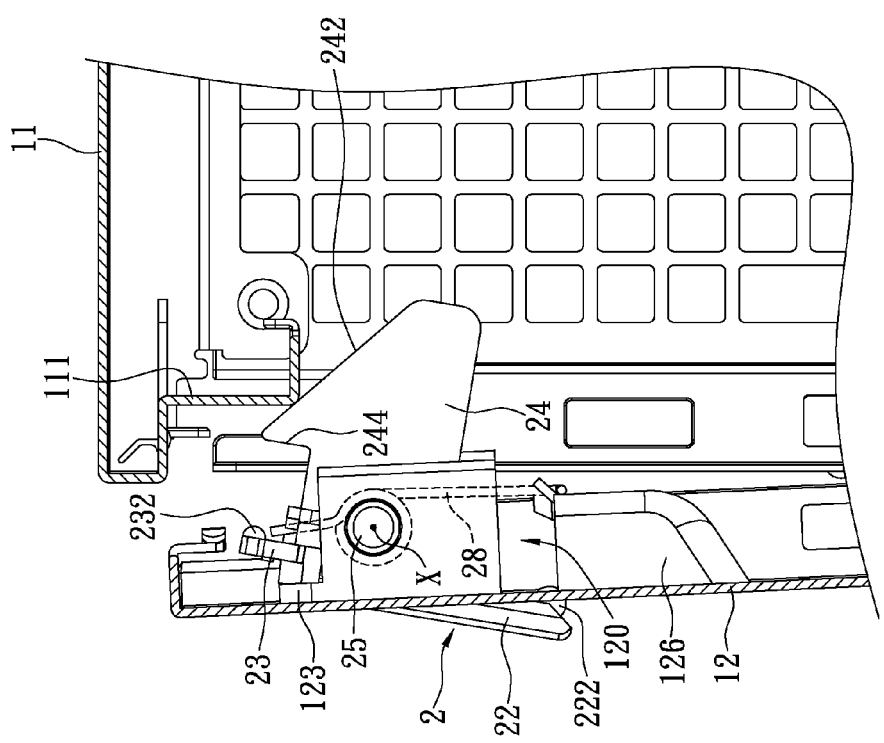

Please refer to FIG. 4B. The oblique surface 242 of the hook piece 24 is pushed to against the retaining portion 111 and slide on the retaining portion 111 so as to correspondingly rotate the hook piece 24 about the rotating axis X. Until the hooking end 244 of the hook piece 24 contacts and exerts an action force to a bottom of the retaining portion 111, the retaining portion 111 will produce a reaction force to the hook piece 24. In the same time, the hook piece 24 is rotating clockwise about the rotating axis X, as shown in FIG. 4C. During the process of closing the covering plate 12, the user is not required to pull the holding portion 22, just push the covering plate 12. The hook piece 24 will continuously rotate until the condition as shown in FIG. 4D, and the hooking end 244 of the hook piece 24 contacts the bottom of the retaining portion 111. In the meantime, the elastic element 28 is stretched by the rotation of the holding portion 22 and has elastic potential energy.

Figure 4E:
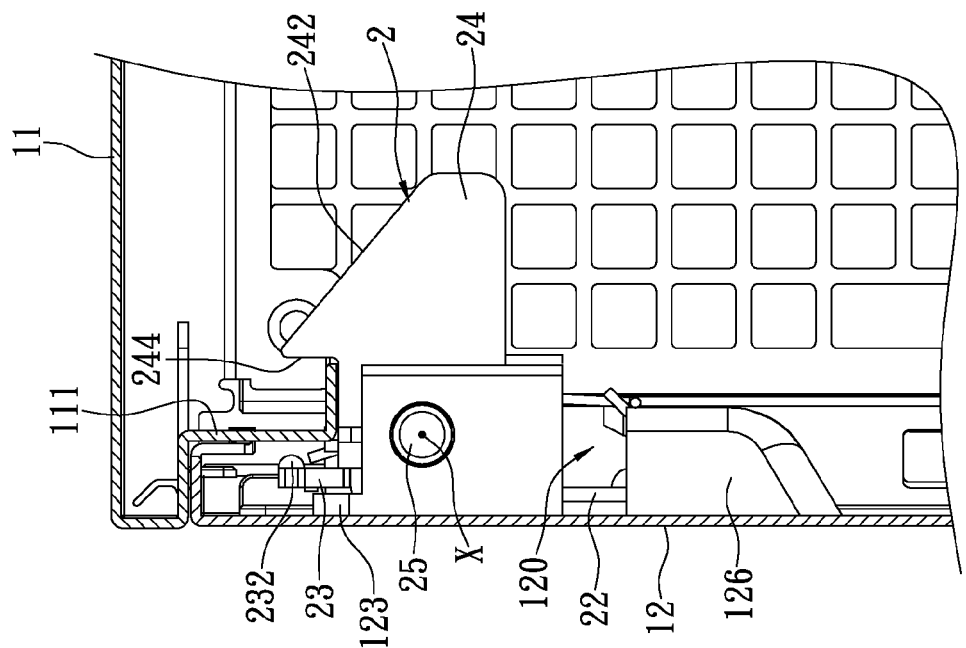

As shown in FIG. 4E, when the covering plate 12 is continuously pushed toward the base plate 11, the hooking end 244 of the hook piece 24 slides over the bottom of the retaining portion 111, and enters into the retaining portion 111.

Figure 4F:
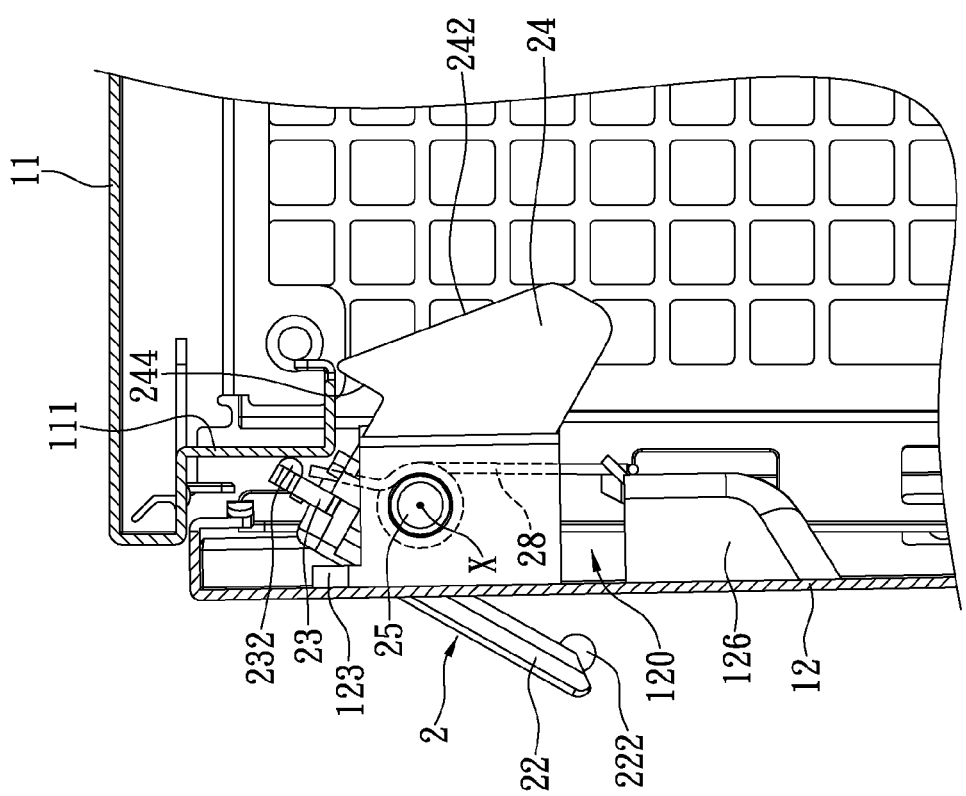

As shown in FIG. 4F, by the elastic potential energy provided form the elastic element 28, the holding portion 22 can rotate counterclockwise about the rotating axis X and come back into the switch recess 120. The hooking end 244 of the hook piece 24 moves upward to engage with the retaining portion 111. Therefore, the covering plate 12 is locked with the base plate 11 by the switch module 2.

When the holding portion 22 is moved outside, the hook piece 24 shifts accordingly and the hooking end 244 is disengaged with the retaining portion 111 to dismount the covering plate 12. When the covering plate 12 is pushed toward the base plate 11 and the hooking end 244 is against the retaining portion 111, the hook piece 24 is rotated correspondingly and engaged with the retaining portion 111 for closing the covering plate 12 to the base plate 11.

In conclusion, the present disclosure provides the housing having quick-dismounting structure, when the holding portion 22 is opening by user, the covering plate 12 is pushed outward in the same time. Therefore, the housing with quick-dismounting structure of the present disclosure can be directly and simply open or close the covering plate 12. Further, the elastic potential energy from the elastic element 28 not only helps the holding portion 22 back to the original position, but also provides action and reaction forces between the switch module 2 and the retaining portion 111. Thus, the present disclosure can open or close the covering plate 12 effortlessly.

Some modifications of these examples, as well as other possibilities will, on reading or having read this description, or having comprehended these examples, will occur to those skilled in the art. Such modifications and variations are comprehended within this invention as described here and claimed below. The description above illustrates only a relative few specific embodiments and examples of the invention. The invention, indeed, does include various modifications and variations made to the structures and operations described herein, which still fall within the scope of the invention as defined in the following claims.

What is claimed is:

1. A housing having quick-dismounting structure, comprising:
    a base plate, having a retaining portion, wherein the retaining portion has a first side substantially perpendicular to the base plate and a bottom side extended from a bottom end of the first side substantially parallel to the base plate;
    a covering plate, having one side corresponding to the retaining portion of the base plate and formed with a switch recess thereon; and
    a switch module, rotatably dispose in the switch recess, said switch module includes:
        a holding portion exposed outside the switch recess, having a stopping member extended from an edge thereof adjacent to the base plate, the stopping member substantially parallel to the first side of the retaining portion, wherein the stopping member has a pushing block protruded toward and approximated to the retaining portion;
        a hook piece protrudedly formed and integrally extended from an inner side of the holding portion toward the base plate; and
        an elastic element, assembled on the holding portion for providing a recovering force for the holding portion and the hook piece;
    wherein the hook piece has an oblique surface slanted to the first side of the retaining portion, a hooking end-portion concaved from a top end of the oblique surface faced the retaining portion, and a recess defined between the hooking end-portion and the stopping portion for selectively restricting the retaining portion therein;
    wherein the pushing block and the hooking end-portion are located at two sides of the retaining portion;
    wherein when the holding portion is moved, the hook piece shifts accordingly and the hooking end-portion is selectably hooked the retaining portion which then lock or disengage the covering plate;
    wherein when a bottom end of the holding portion is rotated outside from the switch recess for opening the covering plate, the pushing block of the stopping member exerts an action force on the retaining portion of the base plate, and the retaining portion of the base plate therefore exerts a reaction force on the holding portion.

2. The housing having quick-dismounting structure as claimed in claim 1, wherein the covering plate has a pair of pivoting boards extended toward the base plate, the pair of pivoting boards are arranged at two side edges of the switch recess, wherein two sides of the switch module have an axle portion respectively, the pair of axle portions is pivotably mounted on the pair of pivoting boards.

3. The housing having quick-dismounting structure as claimed in claim 2, wherein the switch module further includes a mounting seat opposite to the hook piece, wherein the pair of axle portions is formed on an outer side of the hook piece and the mounting seat respectively.

4. The housing having quick-dismounting structure as claimed in claim 3, wherein the mounting seat further includes an inner shaft extended toward the hook piece, wherein the elastic element is a torsion spring for pushing the switch module back to the lock position, the torsion spring is put around the inner shaft, the torsion spring having a first end against the holding portion and a second end against the covering plate.

5. The housing having quick-dismounting structure as claimed in claim 4, wherein the holding portion has a fixing piece formed on an inner side thereof above the mounting seat, the first end of the torsion spring fixed to the fixing piece.

6. The housing having quick-dismounting structure as claimed in claim 4, wherein the covering plate has a shield part disposed on an inner edge of the switch recess and toward the pair of pivoting boards, the shield part has a mounting tab, the second end of the torsion spring is fixed to the mounting tab.

7. The housing having quick-dismounting structure as claimed in claim 1, wherein the stopping member is located in the switch recess and against an inner edge of the covering plate.

8. The housing having quick-dismounting structure as claimed in claim 7, wherein the pushing block and the hooking end-portion are located at two sides of the retaining portion, when the hooking end-portion left the retaining portion, the pushing block is abutted against the retaining portion.

9. The housing having quick-dismounting structure as claimed in claim 8, wherein when the holding portion is moved outside, the pushing block of the stopping member is pushed to against the retaining portion and the hook piece shifts accordingly so as to disengage the hooking end-portion from the retaining portion.

10. The housing having quick-dismounting structure as claimed in claim 9, wherein the oblique surface of the hook piece is approximated to the hooking end-portion and faced the retaining portion, when the covering plate is pushed toward the base plate, the oblique surface of the hook piece is against the retaining portion and slides on the retaining portion so as to correspondingly rotate the hook piece and engaged with the retaining portion for closing the covering plate to the base plate.

11. The housing having quick-dismounting structure as claimed in claim 10, wherein the holding portion is moved outside and the hooking end-portion is disengaged from the retaining portion, the oblique surface of the hook piece contacts and exerts an action force on a bottom of the retaining portion, and the retaining portion provides a reaction force on the hook piece and the covering plate so as the covering plate is continuously pushed outward.

12. The housing having quick-dismounting structure as claimed in claim 7, wherein the holding portion is further formed with an anti-sliding portion on an edge thereof opposite to the stopping member.

\* \* \* \* \*